Feb. 14, 1939. K. C. S. AASTED 2,147,184
PROCESS AND MACHINE FOR TREATMENT OF SEMILIQUID OR
PLASTIC SUBSTANCES, ESPECIALLY CHOCOLATE
Filed Nov. 30, 1935 2 Sheets-Sheet 1
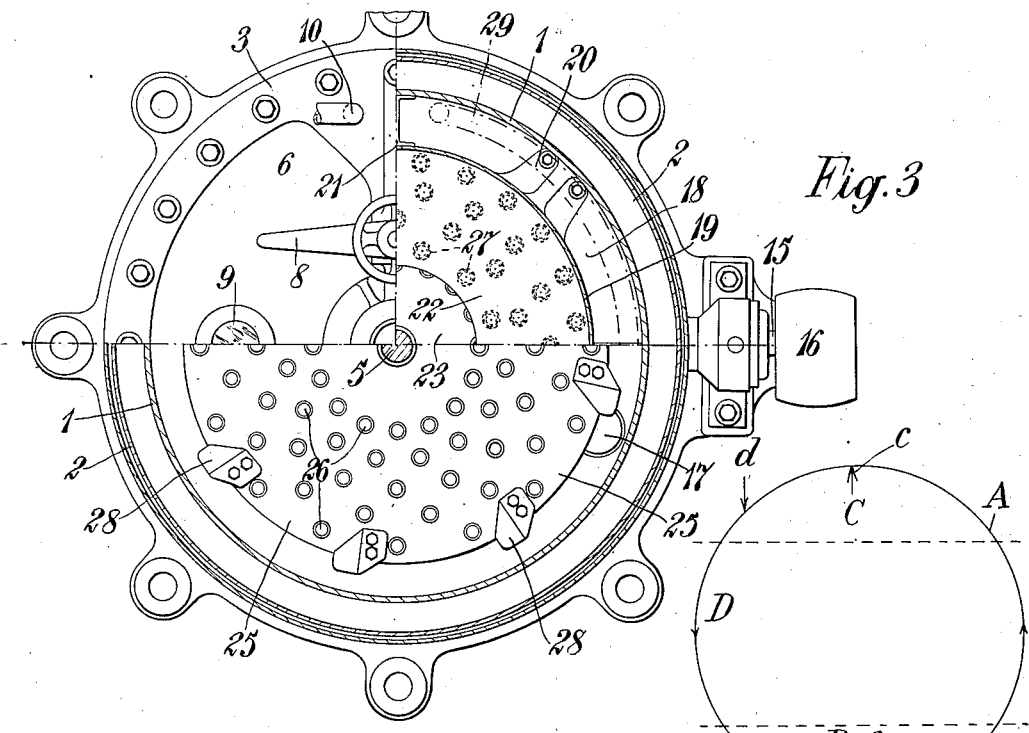
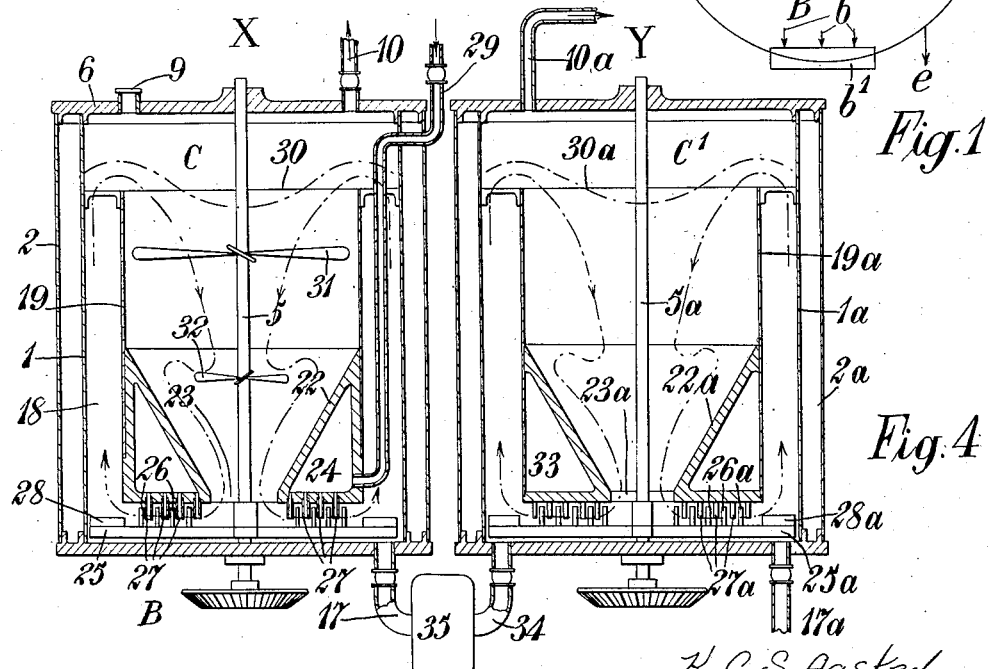

Patented Feb. 14, 1939

2,147,184

UNITED STATES PATENT OFFICE 2,147,184

PROCESS AND MACHINE FOR TREATMENT OF SEMILIQUID OR PLASTIC SUBSTANCES, ESPECIALLY CHOCOLATE

Kai Christian Sophus Aasted, Gentofte, Denmark, assignor of part interest to Boggild & Jacobsen, Copenhagen, Denmark Application November 30, 1935, Serial No. 52,430
In Germany March 27, 1935

11 Claims. (Cl. 99—23)

This invention relates to the treatment of semi-liquid or plastic substances, especially chocolate or the materials or ingredients for making chololate (which may be hereinafter conveniently referred to under the broad term "chocolate") and is more particularly concerned with the treatment generally known as "conching" which is the final operation adapted to develop the desired flavours and to smooth and refine the particles of the mixture before the chocolate is manufactured into various classes of goods.

Apparatus at present in use for conching eating chocolate suffers from certain drawbacks, the apparatus of the kind most favoured by manufactures where the chocolate is subjected to the action of conching arms moving slowly to and fro, requires that the treatment be carried out for an inordinate length of time and usually occupies several days. While the result of this kind of conching is generally considered to be the most satisfactory of known methods, nevertheless microphotographs of the chocolate mass show that treatment for periods varying from 48 to 100 hours is not sufficient to remove a considerable proportion of coral-like agglomerates of sugar and to prevent the occurrence of sharp-edged particles in the mixture. Furthermore, the treated chocolate possesses a relatively high viscosity or a higher viscosity than desirable, due to the emulsified water content which when working at atmospheric pressure and even with prolonged treatment, cannot be greatly lowered, as the motion given to the chocolate only slowly exposes its surface for evaporation.

Other known conching apparatus adapted to accomplish the treatment in a shorter time by employing a vacuum and more vigorous mechanical action, is deficient in that on the one hand there is a loss of the valuable flavouring oils which are essential to the desired taste of the chocolate, owing to the treatment under low pressures in the vacuum vessel, and on the other hand these machines absorb an undue amount of driving power. In the last-mentioned machines although the mechanical refining action is rapid, no better, if as good, refinement of the chocolate is achieved than by the use of the reciprocating conching machines.

It will therefor be apparent that present-day conching apparatus is defective in one or more of the following respects, viz;—the length of time involved in the treatment; the amount of power required if the time factor is considerably reduced; the imperfect refining or smoothing action; the defective flavour or loss of the desired flavours or undue water content and high viscosity.

The present invention is directed to eliminating or reducing to a minimum defects of the above character.

The aim of the invention is firstly to eliminate rapidly the undesired volatile constituents while concurrently retaining and developing the desired flavours, thus producing in an hour or two what according to the most favoured known conching treatment may take days; and secondly to provide improvement in the mechanical refining action (without necessitating undue power output) so that the constituent particles of the chocolate are not only smoother but coral-like clusters are appreciably reduced in size and number.

Another object or advantage of the invention is the reduction of the water content to a low factor (for example, not exceeding 0.1%) without loss of the valuable flavours, in order to lower the viscosity of the product. The lowering of the viscosity of the chocolate is not only important from the flavour aspect but because less cocoa butter may be used for any given result and for the reason that the lower the viscosity, the more the subsequent tempering, moulding and other processes will be facilitated. The lowering of the viscosity also reduces the energy required for the mechanical treatment.

The invention has the advantage that by its aid it is possible to dispense, if desired, with the refining treatment, such as in refiner roll or equivalent machines, which precedes the conching process. Thus saving may be effected by the omission of certain steps usual in chocolate manufacture and enabling materials in cruder or less refined state to be employed in the conching treatment.

Hitherto it has not been profitable, on account of the time and expense, to subject the ingredients of drinking chocolate to a conching treatment. The present invention however, in view of its rapidity of action and the fact that it does not require expensive machinery, makes the subjecting of drinking chocolate to a conching operation, a profitable proposition and thus enables a finer and better flavoured product to be made available.

The invention comprises a method of treating the chocolate to a conching or like process consisting in utilizing air as an extracting agent for the undesired volatile constituents and water content in the mixture, by finely dispersing air in a circulating mass of chocolate and allowing or causing in the circuit escape of the air and the liberation of a proportion of the undesired volatile constituents and water vapour with the escaping air.

The invention also comprises repeatedly and alternately introducing air into a mass of chocolate to form a fine dispersion therein and removing air together with a proportion of the water content and undesired volatile constituents of the chocolate.

It is to be understood that where reference is made to fine dispersion of the air this means a distribution of exceedingly small bubbles, the size of these bubbles being such that they do not immediately rise to the surface.

The invention also consists in apparatus for carrying out the above method, including the provision of a mechanical device comprising a pair of concentric series of intermeshing pins or pegs, some of which are formed as nozzles for air injection, revolving at high speed so as to produce a rapid impacting and centrifugal effect on the particles of chocolate constituents and the air. Such devices may be employed for refining or comminuting the particles and as circulating means, or additionally they may be used to ensure good dispersion of the air.

Figure 1 of the drawings is a diagram which may conveniently be used to illustrate the principles of the invention. Chocolate is circulated as shown by the closed arrowed circuit A as exemplifying the simplest form of circuit which may lie in vertical or horizontal planes. In the zone indicated at B air (previously purified, dried and tempered) is constantly introduced (as shown by small arrows $b$) either by beating it in with mechanical devices or preferably by blowing it in under pressure through nozzles. The dispersion of the air in the chocolate is ensured by acting thereon with mechanical means (as at $b'$) preferably of the intermeshing centrifugal character above indicated.

The requisite temperature condition may be secured by the use of heat exchange coils or jacketing or, alternatively, the introduced air may be tempered so that it serves the dual function of an extracting and carrying agent and that of imparting the necessary temperature conditions. The jacketing may also be employed in conjunction with the introduction of cooling or warming air according to conditions.

The dispersed air and chocolate travels into zone C where it is exposed to a less pressure than that existing in zone B. For example, if the pressure in B is atmospheric, then the pressure in zone C is slightly below atmosphere. However, it is preferred to operate at relatively high pressures in zone B, for example, that of 1.5 to 3 atmospheres may be maintained, while in zone C the pressure is at 0.5 atmosphere to 1.5 atmospheres, respectively.

The virtue of utilizing a fairly high pressure for the introduction and dispersion of the air, is that it enables the undesired oils or constituents to be more readily separated and carried away from the valuable flavouring agents.

By increasing the pressure in zone B, the boiling point of the various oils in the chocolate will rise. Moreover the palatable oils have all a higher boiling point than the oils with a bad flavour, i. e. they are less volatile.

As the conching normally takes place at a temperature of about 80° centigrade (176° F.) the use of a higher pressure makes it possible to get still further away from the boiling point of the oils previously mentioned, whereby it is possible to evaporate with greater discrimination.

By dispersing the air under pressure, the difference between the boiling points of the above mentioned two kinds of oils is increased, which will further facilitate the evaporation of the most volatile oils, i. e. the oils with the bad flavour.

In zone C the dispersion breaks down and a large proportion of the occluded air coming under the influence of the reduced pressure expands and rises, being liberated at the surface so that it is free to pass out of the vessel, while the air-freed (or partially freed) chocolate is being returned through the intermediate zone D to zone B to receive fresh charges of air. The cycle is continuously repeated. The two zones B and C may be contiguous, but it is preferred that they should be spaced apart as by the intermediate zone D in order to afford greater opportunity for the occluded air to act on the chocolate. In passing through zone C towards zone B, it is preferred that the chocolate should flow over a weir or partition, as at $c$, to aid in the liberation of the air bubbles as they expand under the reduced pressure.

It will be appreciated that fresh air is constantly being introduced as an extracting agent for the undesired oils or volatile constituents and water vapour, and the saturated or loaded air after having duly acted as a carrier passes out of the circuit to be replenished by fresh purified dry and tempered air adapted in its turn to take up its component of undesired flavouring matters and water. The utilization of large quantities of air in this way enables the undesired oils or constituents and a high percentage of water to be extracted without involving the use of undue temperatures such as would be calculated to evaporate or harm the more delicate flavouring essences.

While it is preferred simultaneously to introduce air into the chocolate and act upon the mixture with a mechanical comminuting or refining action, for example so that the mechanical action serves both to refine the chocolate and aid in dispersion, the mechanical refining part of the process might be carried out separately, while in the circuit just described, means would be employed adapted to ensure the required thoroughly fine dispersion of the air in the chocolate. Similarly although the circuit is conveniently included in a single treating vessel, the process might be carried out by circulating the chocolate through two vessels, the zone B being located in one vessel and the zone C in the other.

Previously refined chocolate or the ingredients for making the chocolate is introduced into the circuit as at $d$ and the treated chocolate is discharged as at $e$, the chocolate being fed to the circuit in predetermined quantities at intervals, or at intervals at a predetermined rate (for example feeding at the rate of about 45 lbs. in 3 minutes). Similar quantities are discharged or discharge takes place at a similar rate at corresponding intervals, preferably allowing a period of working to intervene between feeding and discharge, the arrangement being such that the inflow and outflow to and from the circuit is balanced.

Further features of the invention and apparatus according thereto will be hereinafter more particularly described and defined in the claims.

Figure 2 of the accompanying drawings is an elevation partly in section of suitable conching apparatus according to the invention for both aerating and mechanically treating the chocolate.

Figure 3 is a plan view of the apparatus seen in Figure 2 showing a sectional half view of the rotary mechanical refining device (taken on the line a—a of Figure 2) together with one quarter plan view of the counterpart refining device and air injecting means (on the line b—b of Figure 2) and another quarter (outside) view of the top of the apparatus.

Figure 4 is a diagrammatic sectional elevation showing conching apparatus according to the invention and such as seen in Figure 2, delivering to and operating in conjunction with vacuum treating means of similar construction for ensuring the extraction of residual air from the chocolate and a further comminuting of the treated chocolate mass.

Figure 2:
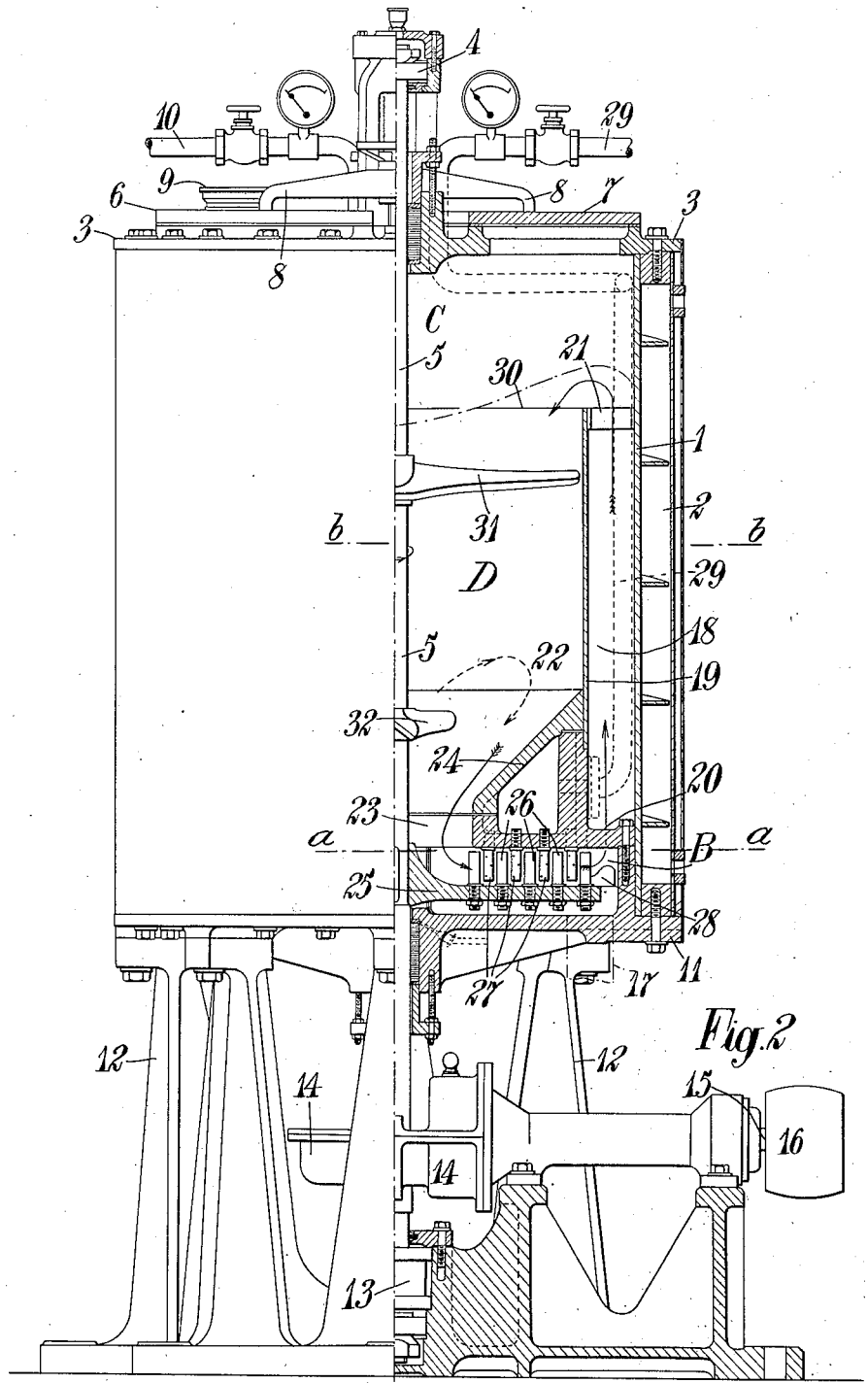

In carrying the invention into effect according to one convenient mode (as described by way of example in conjunction with apparatus adapted to refine or comminute the chocolate as well as dispersing air introduced therein by blowing, and in which the mechanical refining means also aid in promoting the circulation of the chocolate), a cylindrical vessel 1 (Figures 2 and 3) is provided with a jacket 2 through which the temperature controlling medium is circulated. At the top of the vessel an apertured plate or framework 3 supports a bearing 4 for a central rotatable shaft 5. The openings of the frame or plate 3 are closed by a pair of lids 6 and 7 held in position by clamps 8, the lid 6 being provided with a filling aperture 9 closed by a glass-covered observation cap. A valve-controlled air outlet 10 is located in the plate 3, through which a regulatable quantity of air is allowed to escape and so that the required pressure may be established within the vessel.

At the bottom 11 the vessel is supported on pillars 12 and the shaft 5 is positioned in a bearing 13 and driven through gears in the gear cases 14 through a shaft 15 and pulley 16 from any suitable source of power. A discharge outlet at 17 is provided in the bottom 11 of the vessel. Within the vessel 1 and spaced therefrom so as to provide an annular clearance or passageway 18 and a space B (corresponding with the zone B referred to hereinbefore) above the bottom of the vessel, is a cylindrical chamber 19. This chamber is mounted and supported in spaced relationship by lugs or feet 20 at the bottom and distance pieces 21 at the top, leaving a space C in the upper part of the vessel (corresponding with the zone C referred to above). The inner chamber 19 has a conical or funnel-shaped lower part 22 directing the material toward a central opening 23. The funnel 22 also forms one wall of an air chest 24. Fixed on the shaft 5 and lying in the space B is a disc 25, carrying a concentric series of upstanding pins 26 of circular shape in cross-section. Co-operating and intermeshing with these pins is another concentric series of similar pins 27 mounted in the bottom or underside of the air chest 24. All of the pins 27 may be hollow and provided at their extremity with air injection nozzles. Perforations may also be provided in the sides of the nozzle to allow air to escape laterally. Alternatively, some only of the pins need be hollow and communicate with the air chest.

The air blown in is previously purified, dried and tempered, i. e. given the appropriate temperature for the treatment.

The funnel 22 directs chocolate through the central outlet 23 of the inner chamber to the centre or inlet of the disc 25, which, as it rotates at high speed, has a centrifugal action upon the chocolate fed to it and causes it to be flung outward radially. At the periphery of the disc vanes 28 may be located which are adapted to have an elevating effect on the chocolate and assist in its travel up the passage 18. Air under pressure is supplied to the air chest 24 through a valve-controlled pipe 29 passing through the plate 3.

The upper edge of the chamber 19 is adapted to constitute a weir 30, over which the chocolate issuing from the passage 18 flows into the interior of the chamber, the level of the chocolate as it flows over the weir being indicated by the chain dotted line. The shaft 5 is provided with a propeller 31 adapted to afford a down thrust on the chocolate passing to it over the weir. The circuit made by the chocolate in the half of the vessel shown in section in Figure 2 is traced by the arrows. A smaller propeller 32 with its vanes oppositely disposed to those of the propeller 31, causes a local circulation of the chocolate (is indicated by the dotted arrows) to avoid a dead area occurring in the region of the junction of the cylindrical wall of the inner chamber and the funnel 22.

The outlet 17 is valve-controlled and connected to a discharging pump. Instead of discharging through the bottom of the vessel, discharge may be effected through a pipe immersed in the chocolate mass on its return path, after it has flowed over the weir. The contents of the vessel may be discharged into a receiving vacuum or other vat or, as is preferred, it may be delivered to another vessel for further treatment such as will be hereinafter described.

The disc 25 is rotated at a relatively high rate, such as 300 to 800 revolutions per minute. With a disc of 26 inches in diameter, rotation may suitably be effected to produce a peripheral speed of approximately 65 feet per second. Due to the centrifugal action of the pinned disc 25, a strong outward flow is induced in the chocolate which acts not only to promote circulation, but in the refining of the chocolate and air dispersion. The air introduced through the pins 27 is churned up and disintegrated so that a thorough and fine dispersion of the air in the chocolate is effected, while at the same time the particles of chocolate and sugar are subjected to impact and rubbing, with the result that coral-like structures or formations are disintegrated and the individual particles are smoothed or rounded off.

The centrifugal action, with the assistance of the vanes 28, circulates the chocolate (as shown by the arrows) radially outwardly and upwards through the passage 18 into the zone C, where it flows over the weir 30. The propeller 31 forces the chocolate downwardly towards the central opening 23, while the propeller 32 keeps up a local circulation as indicated. It will therefore be seen that the chocolate is continuously kept moving in a circuit radially outwards in zone B, over the weir in zone C, and back again to the centre of zone B. The chocolate in zone B is constantly receiving the injection of fresh air through the nozzles at a predetermined pressure, such as already indicated above. The dispersed air and chocolate rises in a foam-like mass up the annular passage 18, and as it enters the zone C and passes over the weir, occluded air is liberated under the influence of reduced pressure in the zone C. The pressure in zone C is regulated in correspondence with the pressure employed in zone B to ensure a large proportion of the escape of air loaded with water vapour and undesired volatile oil or constituents of the chocolate which escape or are drawn off with the air through the regulating outlet 10. Chocolate from which air has been extracted is returned in circuit to receive fresh injections, the cycle of operations being constantly repeated.

It is preferred to use conching apparatus described above in reference to Figures 2 and 3 in conjunction with an additional air liberating vessel. Such an arrangement is diagrammatically shown in Figure 4, where on the left a conching apparatus X (such as is shown in Figure 1) is diagrammatically illustrated, the reference numerals applied thereto being the same as those used in the description of Figure 2. On the right at Y is a similar apparatus comprising a jacketed vessel 1a having an inner chamber 19a. The chamber has a funnel part 22a leading to an aperture 23a at the centre of a disc 25a, the construction being similar to that of the conching vessel, but no air chest is provided and the pins 26a and 27a have a purely mechanical action, none of the pins 27a in this case acting as air injecting nozzles. If desired, the space 33 corresponding with the air chest 24 of Figure 2 may be utilized for the circulation of a tempering medium.

The upper space C' is connected to a source of vacuum through a pipe 10a. The conching apparatus X and the vacuum apparatus Y are connected together by valve-controlled pipes 17, 34 through a pump 35 which extracts chocolate from the conching vessel and delivers it into the bottom of the vacuum vessel. A valve-controlled pipe 17a is provided for discharging the contents of the vacuum vessel.

The shafts 5 and 5a of the two vessels may be driven at the same speed from the same source of power, or each may be independently driven at a different speed, the respective rates being arranged so that the functions of the two vessels may be most effectively carried out. Propellers such as 31 and 32 of the conching vessel may be employed in the inner chamber of the vacuum vessel, or it may be that the centrifugal action of the disc 25a and lifting vanes 28a may be sufficient to secure the desired circulation in the vacuum vessel Y as indicated by the arrows. The circulating chocolate is mechanically acted upon by the pinned disc 25 and as the chocolate flows over the weir edge 30a of the chamber 19a and is subjected to the reduced pressure in the space C', any air remaining in the chocolate from the treatment in the conching apparatus X is gradually extracted and carried away, thus reducing the chocolate to a homogeneous mass of the desired consistency.

In starting up, the conching vessel is fully charged and operated for a period fully to treat the charge, after which it is transferred to the vacuum vessel and another charge treated in the conching vessel so that both vessels are full. Alternatively, both vessels may be charged with previously treated chocolate. Subsequently chocolate (or the ingredients for making chocolate) may be fed into the conching vessel X through the inlet 9 continuously, in which case a corresponding proportion of the chocolate is continuously discharged to the vacuum apparatus Y by the pump 35 and extracted therefrom at the outlet 17a. However, it is preferred to provide an intermittent feed of chocolate. For example, about 45 lbs. of chocolate are introduced over a period of 3 minutes through the inlet 9, after which the conching operation continues for a period of 3 minutes, when a corresponding quantity of chocolate is extracted by the pump 35 and delivered to the vacuum vessel, wherein the chocolate is treated for a further period of 3 minutes, after which a corresponding amount is discharged through the outlet and the cycle repeated.

It will be appreciated that according to this method of working, a small proportion of untreated chocolate will be delivered during each operation to the vacuum vessel, but as the infeed is such a small fraction of the total contents which is, say, for example, about 900 lbs., the amount of untreated chocolate mixed with treated chocolate delivered, is insignificant.

It will be appreciated that according to the method of treatment above described, the desired conching effect is quickly attained and that a large quantity of chocolate may be passed through the apparatus and delivered in so short a time as one hour. The delivered product is of superior quality, having excellent flavour, low viscosity and a fine smooth texture markedly free from coral-like agglomerations and sharp-edged particles.

Although it is convenient to provide two combined pieces of apparatus for producing the final product, one for the air treatment and another for eliminating residual air and for further comminution of the chocolate, the two functions may be carried out in a single vessel or apparatus having an additional zone or zones separated by partitions or compartments but in liquid communication in which the chocolate is subjected to reduced pressure or vacuum at relatively low temperatures, such as to avoid the loss of volatile valuable constituents after repeated circulation.

It will be appreciated that the invention may be applied to substances other than chocolate to which the invention would be of benefit in refining and eliminating volatile or like constituents, or by otherwise improving the composition thereof by air treatment.

Having now described my invention what I claim as new and desire to secure by Letters Patent is:

1. A method of treating chocolate and other substances of a similar semi-liquid or plastic character to a conching operation which consists in circulating the substance, introducing air into the circuit in a fine state of subdivision by the aid of mechanical beating means, effecting by said beating means a refining and comminuting action upon the substance, and removing the dispersed air at another part of the circuit to carry off undesired volatile constituents.

2. A method of treating chocolate and other substances of a similar semi-liquid or plastic character to a two-stage conching operation which consists in circulating the substance, introducing air into the circulating mass, producing a fine dispersion of air by mechanically beating the mass and at the same time refining and comminuting the substance, and removing the dispersed air at another part of the circuit to carry off undesired volatile constituents, and at the second stage subjecting the substance to agitation under a pressure lower than atmosphere pressure to extract residual air from the previously aerated mass.

3. Apparatus for conching chocolate and other substances of a similar semi-liquid or plastic character comprising, in combination, means for causing a circulation of the substance within the container, means for introducing air into the circulating mass, mechanical beating means for producing a fine dispersion of the air in the mass and at the same time refining and comminuting the substance, and means for removing the dispersed air at a point in the circuit other than its point of introduction whereby air is continuously passed in finely dispersed condition through the mass.

4. Apparatus for conching chocolate and mixtures of a similar semi-liquid or plastic character comprising, in combination, a container, propelling means for displacing the mixture in a closed circuit within the container, means for introducing air into the circuit, mechanical beating means for finely dispersing the air and for refining and comminuting the mixture, and means for removing air and vapours from the circulating mass so that fresh air is continually passed through the material being treated to act as an extracting agent for water vapour and other volatile constituents present.

5. Apparatus for conching chocolate and substances of a similar semi-liquid or plastic character comprising, in combination, a container, means for circulating the substance within the container in substantially vertical planes, means for introducing air at the lower part of the circuit, beating means for finely dispersing the air and also for refining and comminuting the substance, and means for removing air from the circulating mass at the upper part of the circuit where the direction of movement of the mass is reversed.

6. Apparatus for conching chocolate and substances of a similar semi-liquid or plastic character comprising, in combination, a container, inner partition means within the container and spaced from the bottom thereof forming a bottom clearance space communicating with an annular passage between the partition and the container and said clearance space, centrifugally acting beating means in said clearance space, nozzle means for introducing air under pressure adjacent the beating means, and propelling means for directing the material being treated downwardly through the inner chamber and through the beating means.

7. Apparatus having the features of claim 6, including additional propelling means for circulating the chocolate to obviate dead areas.

8. Apparatus for conching chocolate and substances of a similar semi-liquid or plastic character comprising, in combination, a container, means for circulating the plastic or dough-like material within the container, means for introducing air at one point in the circuit and for removing air at another point in the circuit, and beating means comprising intermeshing series of pins for effecting a fine dispersal of air within the circulating mass and at the same time for refining and comminuting the mass.

9. Apparatus for conching chocolate and substances of a similar semi-liquid or plastic character comprising, in combination, a substantially closed container, propelling means for maintaining circulation of the plastic or dough-like material therein in a defined path, series of relatively rotatable intermeshing pins formed and adapted to refine and comminute the circulating material, some of said pins being formed as nozzles, means for introducing air under pressure through said nozzles and means for regulatably removing air at a point remote from the nozzles.

10. Apparatus for conching chocolate and substances of a similar semi-liquid or plastic character comprising, in combination, a container, inner partition means spaced from the wall of the container to form an annular passage and a bottom clearance communicating with the passage and with a chamber within the partition means, centrifugally acting beating means in said clearance adapted to refine and comminute the plastic and dough-like material, nozzle means for introducing air under pressure adjacent said beating means whereby the introduced air will be beaten into and finely dispersed throughout the material, propelling means for directing the material downwardly through the chamber and beating means and thence upwardly and through the annular passage, and means for maintaining a relatively lower pressure in the upper part of the said passage for continuously removing air and vapour from the material as it passes from the passage and downwardly into the chamber.

11. Apparatus for conching chocolate and substances of a similar semi-liquid or plastic character comprising, in combination, a container, partition means spaced from the wall and bottom of the container to form an annular passage and a bottom clearance, rotatable means in said clearance, pins on said disc, pins on said partition means intermeshing with said first pins and adapted when moved relatively to effect a beating and refining action upon the material being treated, nozzle means formed in certain of said pins for the introduction of air into the material to cause said air to be beaten in and finely dispersed in the said material, propeller means in the inner chamber for displacing the plastic or dough-like material downwardly into the beating means in the bottom clearance, and means for maintaining a pressure at the upper end of the container adapted to effect a continuous withdrawal of the air and vapour dispersed in the material.

KAI CHRISTIAN SOPHUS AASTED.